(12) United States Patent
Srivastava et al.

(10) Patent No.: US 11,036,266 B2
(45) Date of Patent: *Jun. 15, 2021

(54) METHODS, SYSTEMS AND APPARATUS FOR DYNAMIC TEMPERATURE AWARE FUNCTIONAL SAFETY

(71) Applicant: Intel Corporation, Santa Clara, CA (US)

(72) Inventors: Amit Kumar Srivastava, Folsom, CA (US); Rao Jagannadha Rapeta, Folsom, CA (US); Asad Azam, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/943,155

(22) Filed: Jul. 30, 2020

(65) Prior Publication Data
US 2020/0379530 A1 Dec. 3, 2020

Related U.S. Application Data

(63) Continuation of application No. 16/795,919, filed on Feb. 20, 2020, which is a continuation of application
(Continued)

(51) Int. Cl.
*G06F 1/20* (2006.01)
*G05B 15/02* (2006.01)
(52) U.S. Cl.
CPC .............. *G06F 1/206* (2013.01); *G05B 15/02* (2013.01)

(58) Field of Classification Search
CPC ...................................................... G06F 1/206
(Continued)

(56) References Cited

U.S. PATENT DOCUMENTS 9,448,125 B2  9/2016  Singh et al.
2004/0179576 A1  9/2004  Bowden et al.
(Continued)

OTHER PUBLICATIONS

Franco et al. "Ring Oscillators as Thermal Sensors in FPGAS: Experiments in Low Voltage", 2010 VI Southern Programmable Logic Conference (SPL), Mar. 24-26, 2010.
(Continued)

*Primary Examiner* — Suresh Suryawanshi
(74) *Attorney, Agent, or Firm* — Schwegman Lundberg & Woessner, P.A.

(57) ABSTRACT

The disclosed embodiments relate to methods, systems and apparatus for dynamic temperature aware functional safety. The disclosed embodiments provide adaptive techniques to track extended dynamic temperature range of a System-on-Chip (SOC) and automatically tune critical IP components of the SOC so that system can operate reliably even at high temperatures. The disclosed embodiments relax the overdesign of the SOC components by reusing existing components such as a ring oscillator to determine temperature at different regions of the SOC. In one embodiment, the disclosed principles use a Calibrated Ring Oscillator (CRO) temperature sensors. The CRO-based temperature sensors provide fast temperature measurement suitable for detecting dynamic temperature ranges and temperature rate of change. The CROs are existing on the SOC and do not require addition of additional sensors.

22 Claims, 11 Drawing Sheets

Related U.S. Application Data

No. 16/155,749, filed on Oct. 9, 2018, now Pat. No. 10,664,027.

(58) Field of Classification Search
USPC .......................................................... 700/299
See application file for complete search history.

(56) References Cited

U.S. PATENT DOCUMENTS

| | | | |
|---|---|---|---|
| 2005/0114061 A1* | 5/2005 | Gauthier | G01K 15/00 |
| | | | 702/99 |
| 2006/0173645 A1 | 8/2006 | Floyd et al. | |
| 2007/0191993 A1* | 8/2007 | Wyatt | G06F 11/3034 |
| | | | 700/299 |
| 2015/0286262 A1 | 10/2015 | Park et al. | |
| 2016/0153840 A1* | 6/2016 | Huang | G01K 7/01 |
| | | | 374/163 |
| 2018/0156675 A1* | 6/2018 | Kumahara | G01K 15/007 |
| 2018/0191343 A1 | 7/2018 | Kowkutla et al. | |
| 2019/0049912 A1 | 2/2019 | Poomachandran et al. | |
| 2019/0050515 A1 | 2/2019 | Su et al. | |
| 2019/0199329 A1* | 6/2019 | Shor | H03K 3/0315 |
| 2019/0295282 A1 | 9/2019 | Smolyanskiy et al. | |
| 2020/0333393 A1* | 10/2020 | Fayneh | G01R 31/2884 |

OTHER PUBLICATIONS

Coskun et al, Static and Dynamic Temperature-Aware Scheduling for Multiprocessor SoCs, 2008, IEEE, pp. 14 (Year: 2008).

* cited by examiner

METHODS, SYSTEMS AND APPARATUS FOR DYNAMIC TEMPERATURE AWARE FUNCTIONAL SAFETY

This application claims the filing-date benefit of application Ser. No. 16/795,919, filed Feb. 20, 2020, which is a Continuation of application Ser. No. 16/155,749 (now U.S. Pat. No. 10,664,027), filed Oct. 9, 2018 (issued May 26, 2020). The specification of each of the foregoing application is incorporated herein in its entirety.

BACKGROUND

Automotive and Industrial application targeted systems need to operate at extended dynamic temperature ranges. Typical temperatures span from −40° C. to 125° C. In some applications, the operating temperature exceeds 145° C. or more. Conventional System-On-Chip ("SOC") can support dynamic temperature range from 0° C. to 70° C. This is partly due to the fact that the functions (IP) that the SOC Intellectual Property (IP) core is designed to operate up to 105° C. and fails beyond this point.

Conventional SOC solutions use a temperature sensor. Such methods are suitable for static temperature monitoring but not useful for fast tracking. The temperature sensors also require special process devices such as BJT, diodes and transistors which occupy valuable space and also not available in some process geometry.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
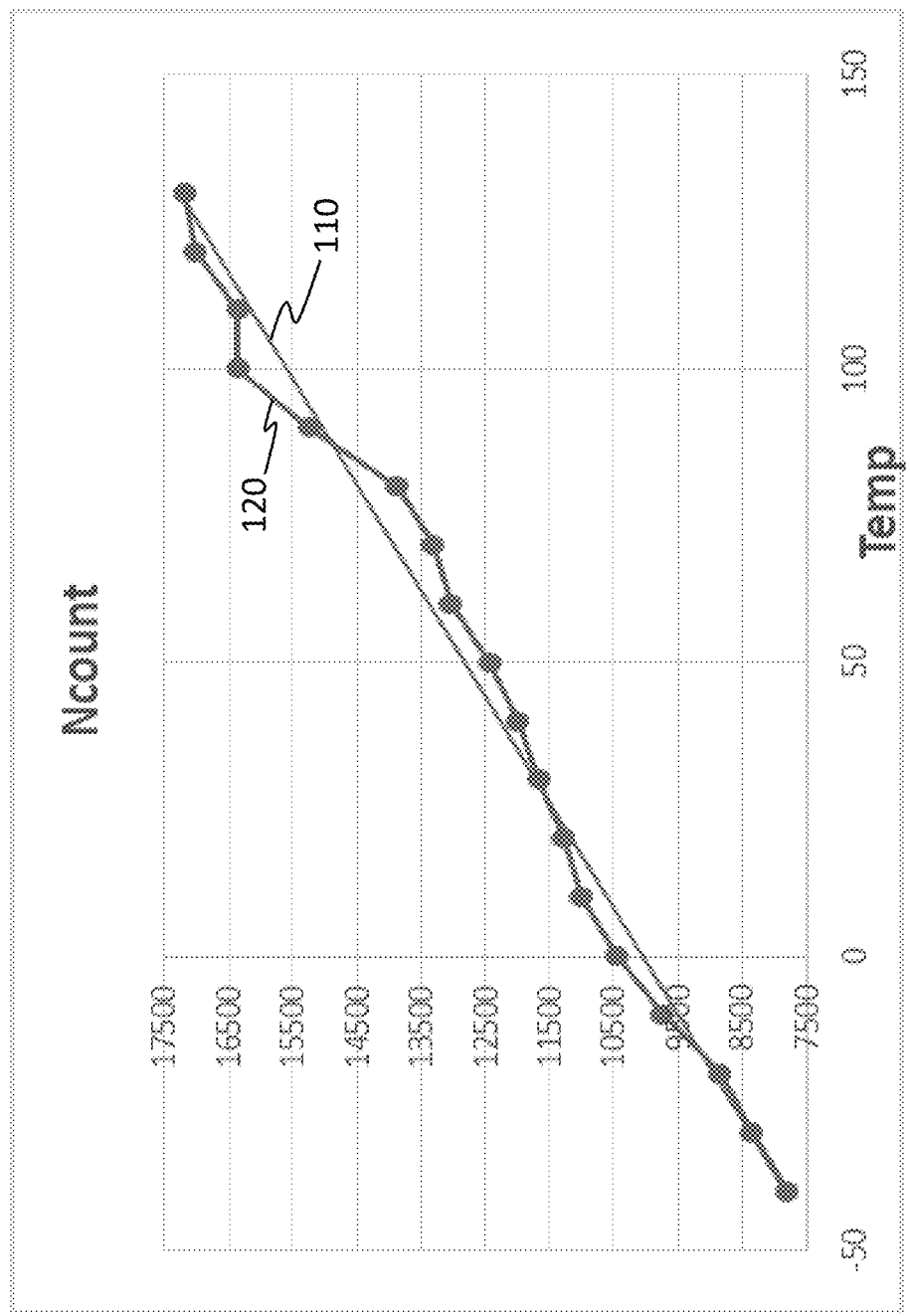
FIG. 1 illustrates the relationship between N-Count and temperature according to one embodiment of the disclosure.

Functional safety (FuSa) is important for the real time complex systems in the Internet of Things (IOT) applications such as automotive and industrial segments. All these applications impose tighter constraints on the system to perform safely and reliably under complex and noisy environment across products life cycle. For such applications, FuSa mechanisms are vital to detect latent and single-point faults in-field. One such cause of system failure is undetected temperature rise due to various switching of devices inside SOC.

A conventional approach to detect temperature is to use special one or more temperature sensors. Such sensors are typically transistor-based (e.g., bipolar junction transistors) or diode-based sensors which are used for sensing temperature across the SOC. One of the disadvantages of the conventional method is to get special process devices for temperature sensors which is not suitable for next generation process nodes. In addition to being costly, such sensors are slow to detect and are suitable for monitoring static temperature ranges.

To address this and other deficiencies of the conventional SOC temperature measurement systems, an embodiment of the disclosure provides FuSa engine sense temperature range using a calibrated ring oscillator ("CRO") as the thermal sensor. The output of the CRO can be compared with pre-defined extended temperature limit of targeted IP. Based on this information, FuSa engine can configure analog and/or mixed signal IP or RF IP to ensure that the temperature range does not exceed the operating dynamic range so as to avoid impacting IP functionality. In one embodiment, SOC's configuration may be changed to avoid temperature malfunction. The SOC configuration change may include changing one or more of the Phase Lock Loop ("PLL"), tuning band or receiver ("Rx") equalization gain/pole frequencies, gain of critical analog IP, throttling of IO data rate and power management of IPs, among others.

The disclosed principles provide many advantages. For example, the disclosed embodiments provide means for high resolution, low-cost, temperature measurement. The disclosed embodiments also provide fast tracking thermal sensors. The disclosed embodiments allow the chip core IP to operate in a broader temperature range without impacting SOC performance. The disclosed embodiments also provide an autonomous corrective actions to put the system into safe operating state. In certain applications, the temperature information may be relayed to the end user through I/O subsystems which may include audio, visual and camera etc.

In certain embodiment, the frequency count (e.g., center frequency) of a ring oscillator associated with an SOC is used to predict temperature. A ring oscillator is a device composed of a number of NOT gates (but possible to implement with any other digital logic) arranged in a ring whose output oscillates between two voltage levels. The ring oscillator has been widely used in analog and digital applications due to its compact design, wide tuning range and low power consumption. The ring oscillator clocks runs on regulated and supplied analog voltage. Process calibrating the ring oscillator clock and running in regulated supply allows the clock to be a function of the temperature. A controller may then detect the oscillator's clock frequency and generate a count (N) as described further below. The controller may also compare the count (N) with a reference count (N'). The reference count may be selected based on calibration logic to indicate the IP processing and its correlation to temperature. The temperature gradient may be used in a look-up table. The look-up table may be periodically calibrated with an on-die temperature sensor. The controller can then configure operation of the IP during applicable dynamic temperature ranges.

In certain embodiments, a functional safety island (i.e., core FuSa safety control logic or a controller) may be responsible for implementing dynamic temperature sensing. The FuSa control logic may receive temperature indication such as rate of temperature change from one or more process-calibrated ring oscillator sensors.

FIG. 1 illustrates the relationship between N-Count (frequency count) and temperature according to one embodiment of the disclosure. Specifically, FIG. 1 shows count values in relation to temperature changes for a 400 MHz clock and a 32 KHz clock. In the plot of FIG. 1, Ncount is a ratio of $F_{sense}$ to $F_{xtal}$; $F_{sense}$ denotes the sensed frequency of a calibrated ring oscillator and $F_{xtal}$ denotes the crystal clock frequency as further discussed below. In FIG. 1, line 110 represents the ideal (theoretical), linear relationship and line 120 represents the measured count value. As shown in plot of FIG. 1, there is only a small variation between the ideal and the actual count.

The ring oscillator clock runs on analog voltage regulator supply. By process-calibrating the ring oscillator clock and running the ring oscillator on a regulated voltage supply, the oscillator count may considered be substantially a function of temperature. Further, a plurality of calibrated ring oscillators may be positioned at different location on the chip to provide a more accurate understanding of the chip components.

In an exemplary embodiment, a logic circuit (e.g., controller) is configured to detect clock frequency of the ring oscillator ($F_{SENSE}$) and, using crystal ($F_{XTAL}$) oscillator clock frequency, generates the count ratio as $F_{SENS}/F_{xtal}$. The logic then compares the count with a reference count. The reference count may be selected based on a calibration logic to indicate the process corner and temperature gradient. Process corner refers to die-to-die variations and variations based on locations of the same die due to manufacturing variability. While all chips are fabricated with the expectation to run at a desired chip could be fabricated expect to run at desired operation (known as "typical corner"); if chip behave faster than expected it is considered as a fast corner; if chip behaves slower than expected then it is considered as a slow corner.

A temperature gradient may then be obtained from a look-up table. The look-up table may also be calibrated periodically with an on-die temperature sensor. Based on the detection logic, the safety critical IP may be configured to operate during dynamic temperature range. Also, the operating parameter of the critical IP may be adjusted to prevent overheating or to optimize the IP's operation.

In reference to the plot of FIG. 1, it can be seen that the rate of temperature change can be defined as shown in Equation (1) as follows:

$$dT/dt = \text{Count}(N) - \text{Count}(N-1); \text{ where count}(N) = F_{sense}/F_{ref} \quad (1)$$

Figure 2:
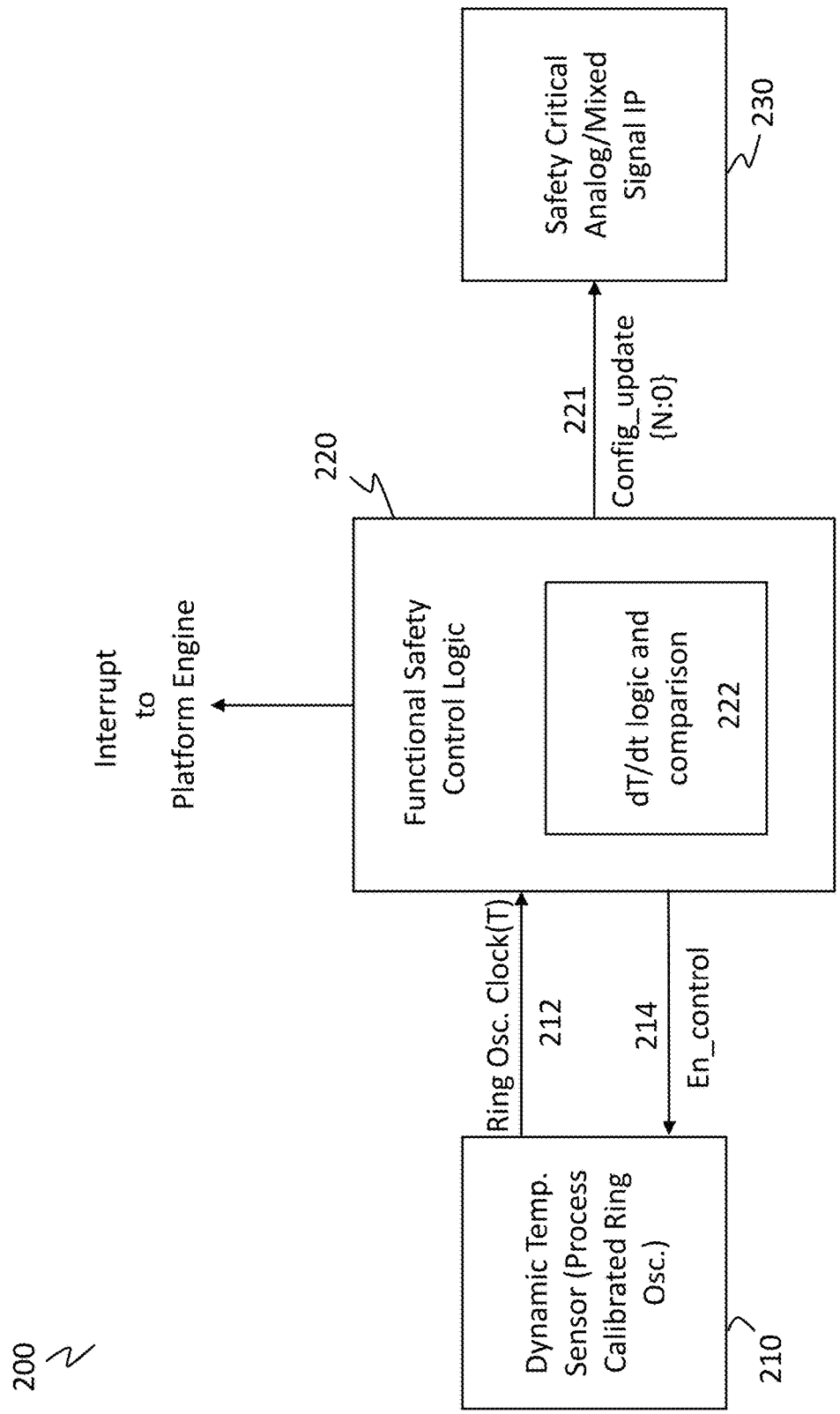
FIG. 2 schematically illustrates an exemplary system according to one embodiment of the disclosure.

FIG. 2 schematically illustrates an exemplary system according to one embodiment of the disclosure. System 200 of FIG. 2 may be implemented as part of a SOC. System 200 may be integrated into a single die which may also house other IP components. System 200 of FIG. 2 includes dynamic temperature sensor 210 (interchangeably, process calibrated ring oscillator; FuSa control logic 220 with logic comparison 222 and safety critical analog/mixed signal IP 230.

Dynamic temperature sensor 210 may comprise a process calibrated ring oscillator. The process calibrated ring oscillator 210 may be positioned anywhere on the SOC. In one embodiment, the process calibrated ring oscillator may be integrated with the SOC. In another embodiment, a plurality of process calibrated ring oscillator may be placed at different locations on the chip to provide a more accurate and dynamic temperature estimate.

In one embodiment, the output of the process calibrated ring oscillator is the ring oscillator clock count which may be correlated to temperature (T). This is shown as signal 212 in FIG. 2. The ring oscillator clock count is directed to FuSa control logic 220. FuSa control logic may comprise hardware, software or a combination of hardware and software (e.g., firmware) configured with instructions to receive temperature estimate (T) from process calibrated ring oscillator 210, determine whether dynamic temperature is acceptable (e.g., dT/dt logic and comparison 220) and issue configuration update 221 to safety critical component 230. FuSa 220 may also be configured to provide an interrupt signal to SOC platform engine as needed. The interrupt signal may be used to prevent runaway temperature rise or to address other safety concerns. FuSa 220 may also provide a control signal (En_control) 214 to turn dynamic temperature sensor 210 on or off.

FuSa control logic 220 may include one or more actual or virtual logics to compare dynamic sensing information from calibrated ring oscillator 210, obtain values from one or more look-up tables and arrive at a decision. The decision may be to continue SOC operation at the respective portions of the chip, increase or decrease operations (to accommodate cooling) or to halt operation all together.

Configuration updates have temperature information. The temperature information is different for different IP components and can be based on location of the IP component. In FIG. 2, N is parameterized and is possible for one IP need 3 bits while other IP need 7 bits information (granularity) for temperature changes. Higher the bits may require more granularity in temperature information.

Figure 3:
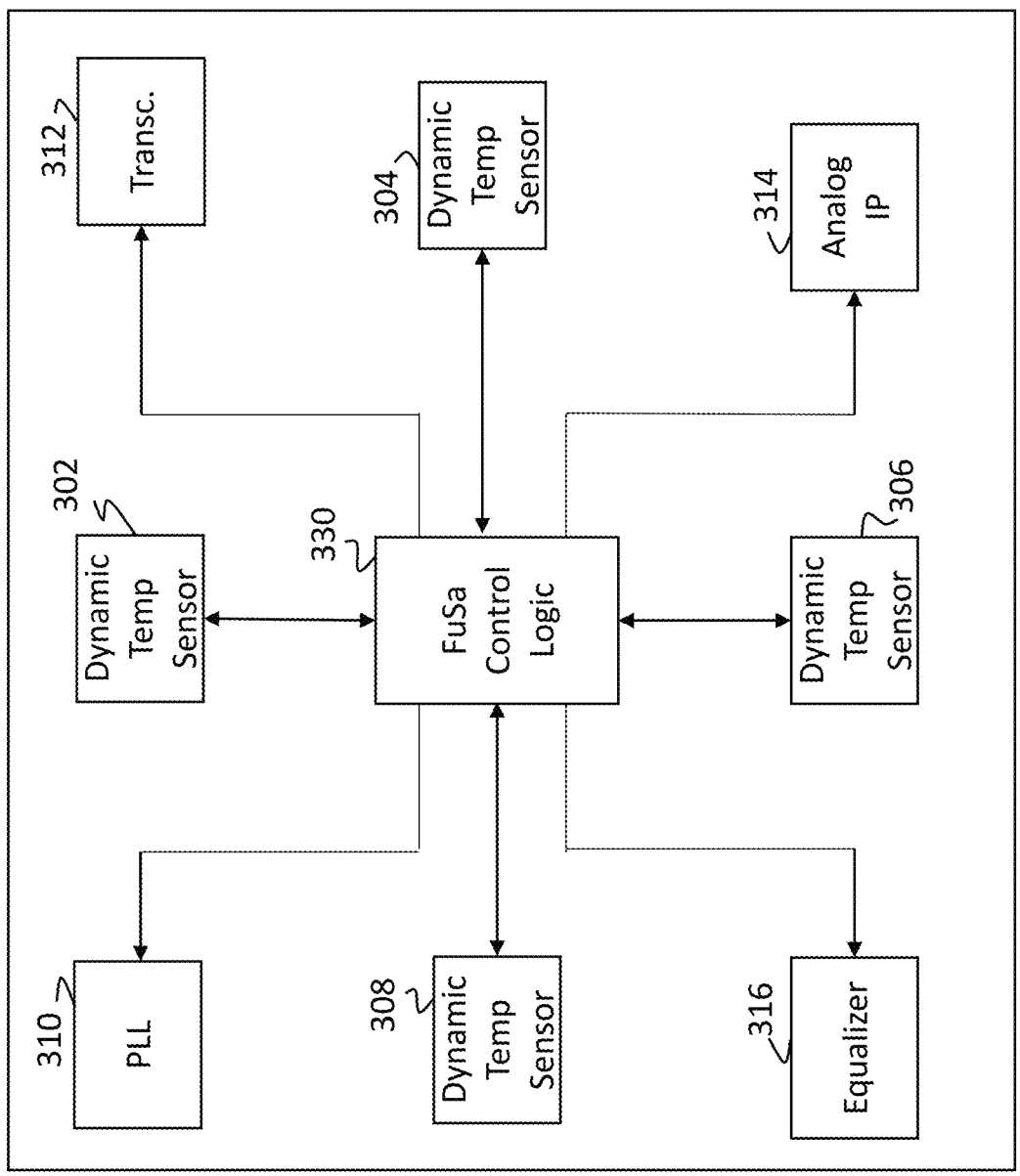
FIG. 3 schematically illustrates an SOC according to one embodiment of the disclosure.

FIG. 3 schematically illustrates an SOC according to one embodiment of the disclosure. Specifically, FIG. 3 shows SOC 300 having dynamic temperature sensors 302, 304, 306 and 308 positioned at different locations on the chip. Dynamic temperature sensors 302, 304, 306 and 308 may be a calibrated ring oscillator as disclosed herein. In another embodiment, temperature sensors 302, 304, 306 and 308 may comprise different sensors (e.g., dynamic temperature sensors and static temperature sensors). Each of the dynamic temperature sensors 302, 304, 306 and 308 may be calibrated according to the environment it serves.

In SOC 300, dynamic temperature sensors 302, 308 are positioned adjacent Phase Lock Loop (PLL) 310. Dynamic temperature sensors 302 and 304 are positioned adjacent to transceiver 312. Dynamic temperature sensors 304, 306 are positioned adjacent analog IP circuitry 314. Dynamic temperature sensors 306, 308 are positioned adjacent equalizer 316.

Each dynamic temperature sensor communicates with functional safety (FuSa) control logic 330. FuSa control logic 330 may comprise, hardware, software or a combination of hardware and software. FuSa control logic 330 may include, for example, one or more processor circuitries (not shown) and memory circuitries (not shown). Memory circuities (not shown) of FuSa 330 may include look-up tables needed to calibrate each of the dynamic temperature sensors 302, 304, 306 and 308. In an exemplary embodiment, FuSa 330 receives temperature location in terms of clock frequency from each zone (i.e., from each of the dynamic temperature sensors 302, 304, 306 and 308) and detects (and tracks) the dynamic temperature change for each zone. In this manner, FuSa control logic 330 may be considered as a safety control Logic. Depending on the general area of a detected temperature rise, FuSa 330 may control various IP circuitries to meet performance for an extended temperature range.

The one more or more processors (not shown) of the FuSa control logic 330 may communicate with the various dynamic temperature sensors and with IPs 310, 312, 314 and 316. The one or more processors (not shown) may engage each IP independently. In one exemplary embodiment, if dynamic temperature increase is detected at a region (e.g., at PLL 310 region), FuSa control logic may decrease activities of the PLL to allow temperature reduction.

Figure 4:
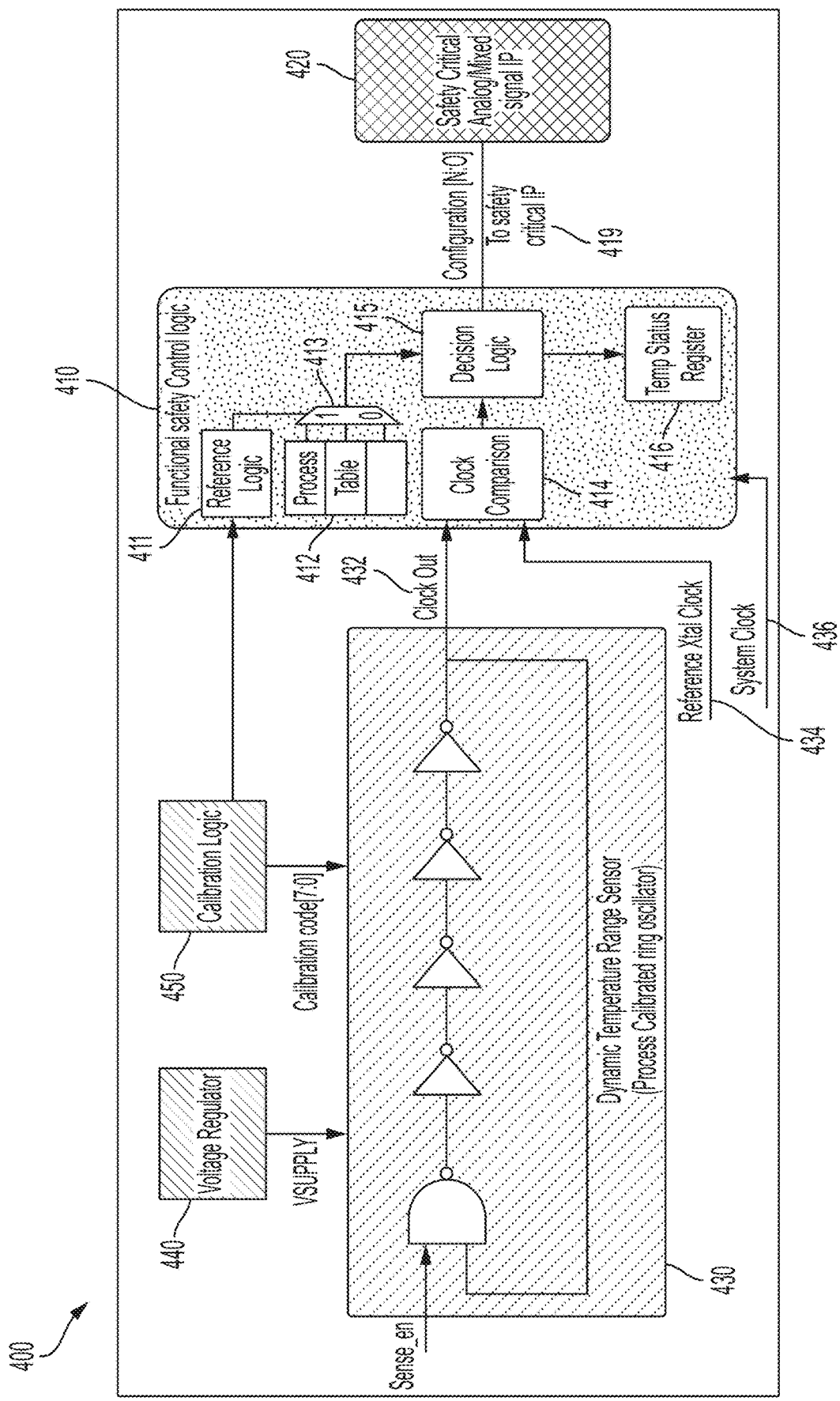
FIG. 4 schematically shows an exemplary implementation of an embodiment of the disclosure.

FIG. 4 schematically shows an exemplary implementation of an embodiment of the disclosure. Circuit 400 of FIG. 4 may be implemented on a single die and as part of a SOC. In FIG. 4, FuSa control logic 410 receives input from calibration logic 450 and calibrated ring oscillator 430. The output of FuSa control logic 410 is communicated to safety critical analog/mixed signal IP 420 to increase and/or decrease activities of the various SOC IP in order to allow temperature reduction or to optimize performance.

In the exemplary embodiment of FIG. 4, calibrated ring oscillator 430 receives input (sense_en) and processes the input through a NAND gate coupled in series (a ring) with four NOT gates (or combination of any digital logic gates to enable desire clock). The calibrated ring oscillator 430 also receives input voltage from voltage regulator 440 and calibration logic 450. Calibration logic may comprise one or more lookup tables (not shown) and processors (not shown) to calibrate process calibrated ring oscillator 430.

In one embodiment, the calibration process is implemented as follows. During boot time calibration logic enables the clock with a constant voltage supply (provided by a regulator). During boot time most of the blocks are turned off. Thus, there is no change in temperature. Calibration logic enables the clock and measures the desired frequency within reference clock time and control the calibration code in such a way to meet desired frequency. In this way, die-to-die variations can be avoided.

FuSa 410 receives clock output 432 ($F_{sense}$) of calibrated ring oscillator as well as reference $X_{tal}$ clock 434 and system clock 436. The various input is processed through FuSa 410 to send configuration signal 419 to IP components of the chip. FuSa 410 also comprises multiplexer 413 which receives input from reference logic 411 and process table 412. The output of multiplexer 413 is directed to decision logic 415. Decision logic 415 receives clock comparison results from clock comparison 414 as well as the output from multiplexer 415 and renders a decision (or determination) regarding component temperature change rate. The output of decision logic 415 is directed to temperature status register 416 for storage. The output of decision logic 415 is also directed 419 to IP components 420.

In the exemplary embodiment of FIG. 4, the clock output 430 of calibrated ring oscillator 430 is used for temperature monitoring. Reference clock 434 is used for generating reference steps across various process corners of the SOC. The reference steps may include speeding or slowing the corner components (see FIG. 3). Based on reference logic 411, the required temperature reference steps are identified and used for monitoring the chip. Clock comparison 414 is used to monitor the temperature variation (across the chip) and to configure the safety critical IP when the temperature exceeds a predefined threshold temperature.

Figure 5:
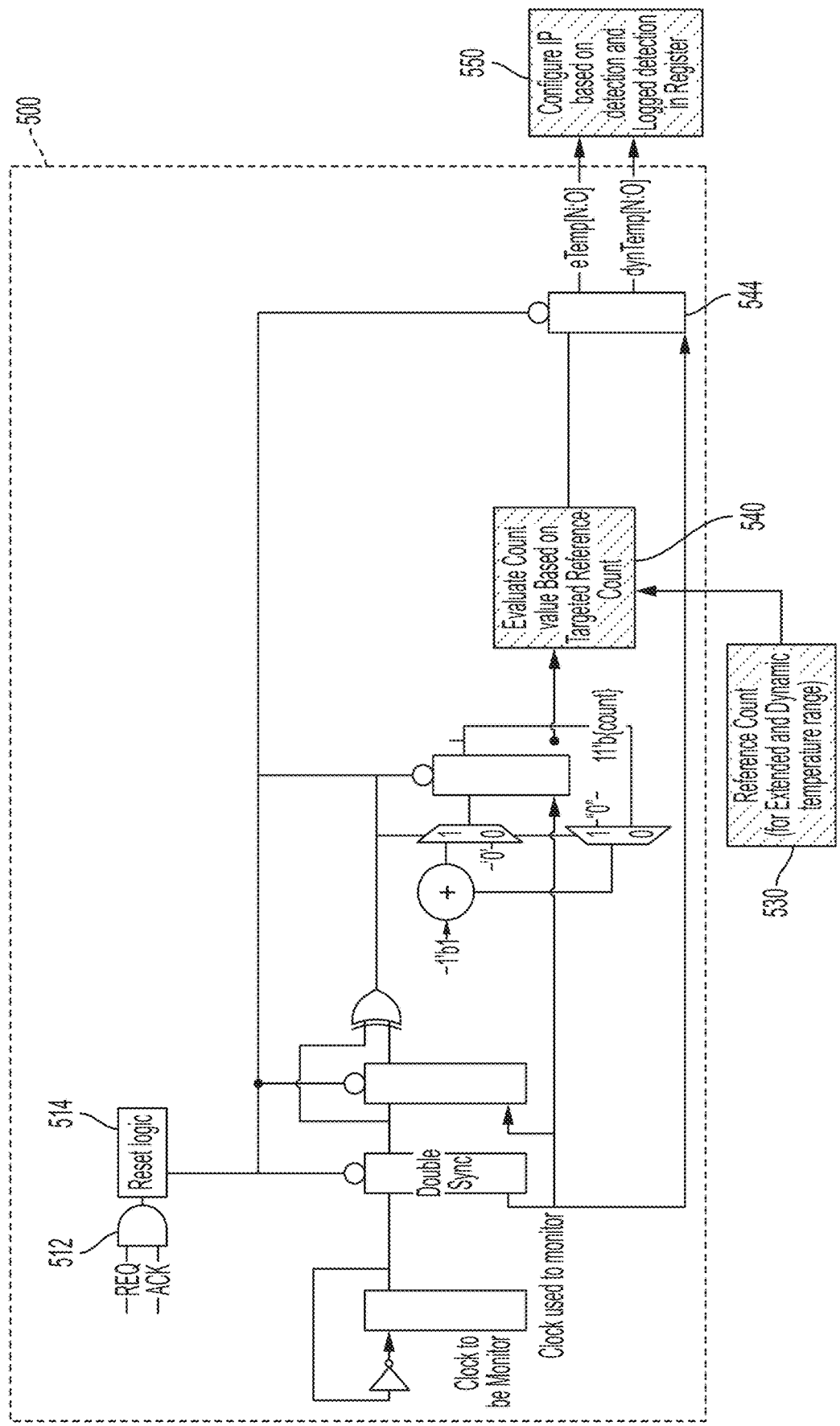
FIG. 5 schematically illustrates an exemplary temperature comparison logic.

FIG. 5 schematically illustrates an exemplary temperature comparison logic. In FIG. 5, AND gate's output drives the reset logic 514. The gate logic arrangement in FIG. 5 provides the input to configure IP 550 on the SOC. The IP configuration is based on the dynamic temperature (dynTemp) and eTemp. In FIG. 5, eTemp here reference to an absolute temperature while dyntemp is temperature change(s) information.

The gate arrays 500 in FIG. 5 are arranged to provide temperature comparison logic. The hardware arrangement of FIG. 5 is largely self-explanatory and will not be discussed. It should be noted that the arrangement of gate arrays in FIG. 5 is exemplary and non-limiting. Other configurations may be arranged to provide the comparison logic output without departing from the disclosed principles.

The reference count 530 is provided as an input to the gate logic of FIG. 5. The reference count 530 is for the extended an dynamic temperature range measurement. The reference count provide reference count (N) values to allow programming or controlling the chip based on the desired reference count.

The Evaluate count logic 540 receives the reference count 530 and compares it with the targeted reference count input received from the gate logic of FIG. 5. The result of the comparison is directed to component 544 which is used to reset the logic.

Figure 6:
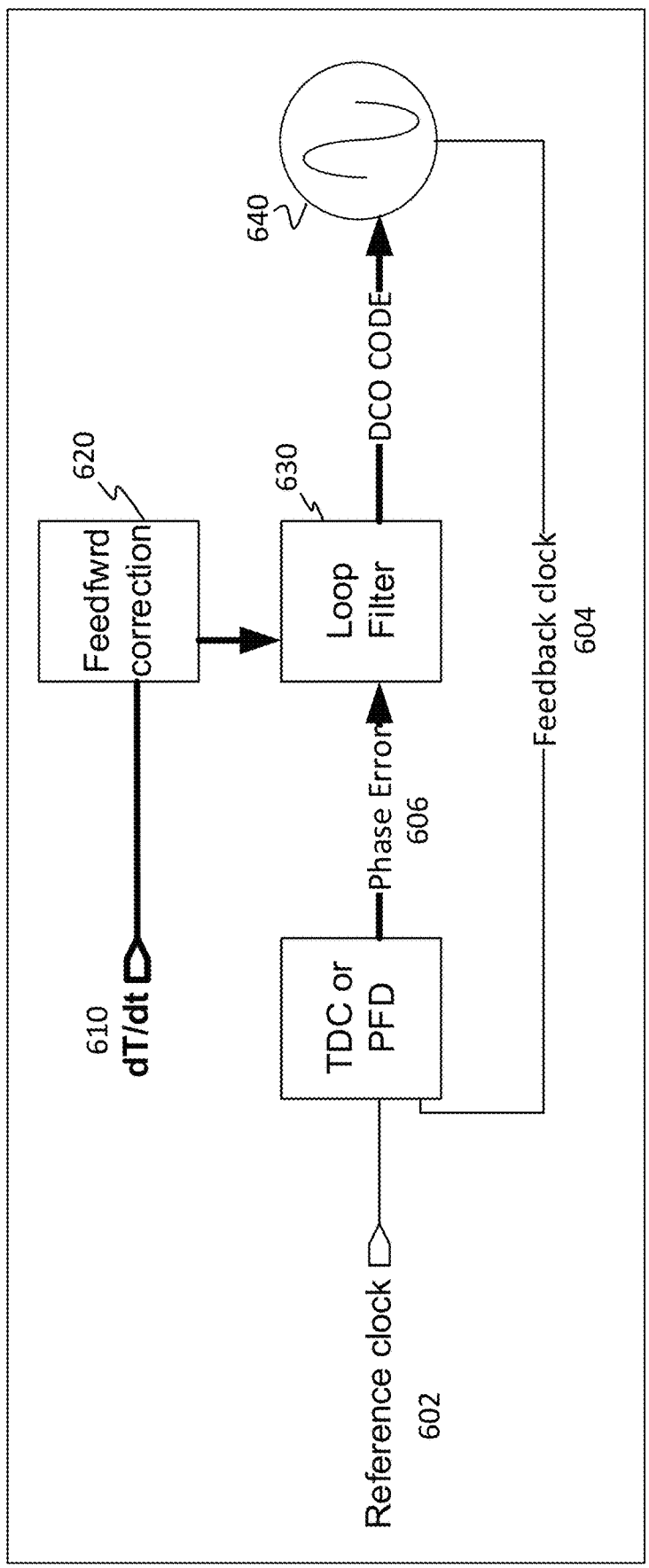
FIG. 6 is a first exemplary use case where dynamic temperature detection according to the disclosed embodiments may be used to tune a PLL component.

FIG. 6 is a first exemplary use case where dynamic temperature detection according to the disclosed embodiments may be used to tune a PLL component. In FIG. 6, the dynamic temperature measurement (dT/dt) 610 (e.g., determined by disclosed principles) is directed to feedforward correction logic 610. Feedforward correction logic may comprise hardware, software or a combination of hardware and software. Moreover, feedforward correction logic (as well as other components of FIG. 6) may reside on the same chip as part of an SOC package.

Reference clock signal 602 is directed to Time to Digital Converter (TDC) or Phase Frequency Detector (PFD). A comparison between reference clock 602 and feedback clock 604 determined phase error 606. Phase error 606 and the output signal from Feedforward correction 620 are then directed to Loop Filter 630, which then issues a Digitally-Controller Oscillator (DCO) code to Voltage-Controlled Oscillator (VCO) 640.

In one implementation of the disclosure, PLL tuning can depend on extended temperature ranges. Thus, it is possible to lock the PLL by changing its tuning range as a function of the dynamic temperature ranges detected during operation of the SOC. That is, it is possible to lock the PLL at frequencies beyond the IP operating limits.

By using a calibrated ring oscillator as disclosed herein, the system can determine whether the process node is operating slow or fast and thereupon select the reference temperature steps. The reference temperature steps refer to expected ideal temperature change steps.

This allows generating different operation configurations for the PLL. The generated configurations help locking the PLL for extended temperature ranges and meeting system performance. Thus, tracking oscillator frequency in the PLL loop can be directly comprehended as part of the PLL feedback loop with feedforward correction mechanism.

Figure 7:
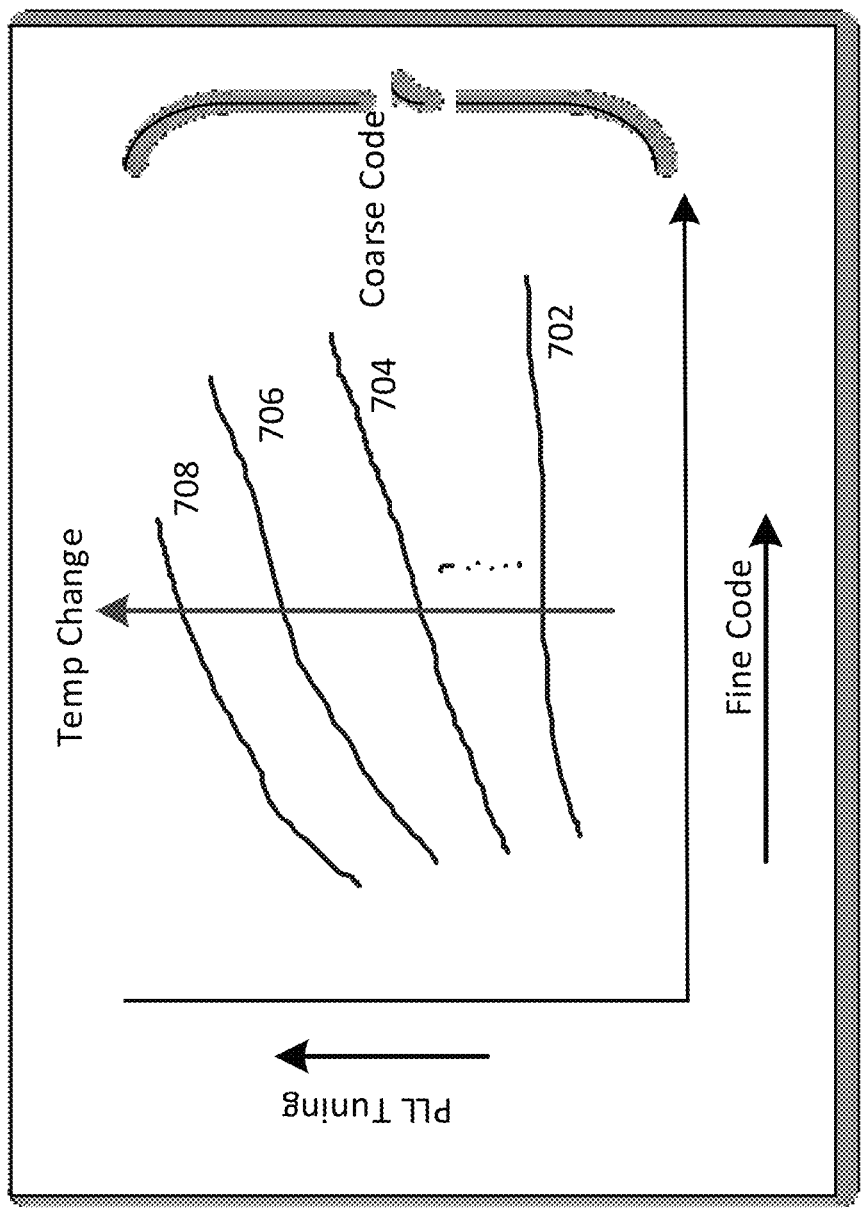
FIG. 7 is a plot of an adaptive PLL tuning according to one embodiment of the disclosure.

FIG. 7 schematically shows an adaptive PLL tuning according to one embodiment of the disclosure. Specifically, FIG. 7 shows the relation between Fine Code (X-axis) and PLL tuning (Y-axis). In FIG. 7 four discrete bands, 702, 704, 706 and 708 are shown. Based on temperature change, change in frequency can be identified and accordingly coarse and fine codes can be adjusted with feedforward correction loop based on temperature change rate. For discrete bands of FIG. 7, equation-based adjustment or table-based adjustment can be used. By way of example, Eq. (2) provides a computational-based feedforward correction (see FIG. 6) for linear behavior of coarse and fine codes:

$$NewFine = OldFine - \frac{NewCoarse - OldCoarse}{\Delta_{fine}} \Delta_{Coarse} + \frac{dT}{dt} * \text{Scale code} \quad \text{(Eq. 2)}$$

The calibrated ring oscillator may be used to with high speed oscillator or other IP components. Tuning a high speed equalizer tuning may depend on the extended temperature ranges in which the equalizer operates.

In certain embodiments, the high speed receiver equalizer is tuned by changing its equalization gain (and optionally, pole-zero frequency) as a function of the detected temperature range. Such tuning allows receiving reliable data from the device over an extended temperature range.

Figure 8:
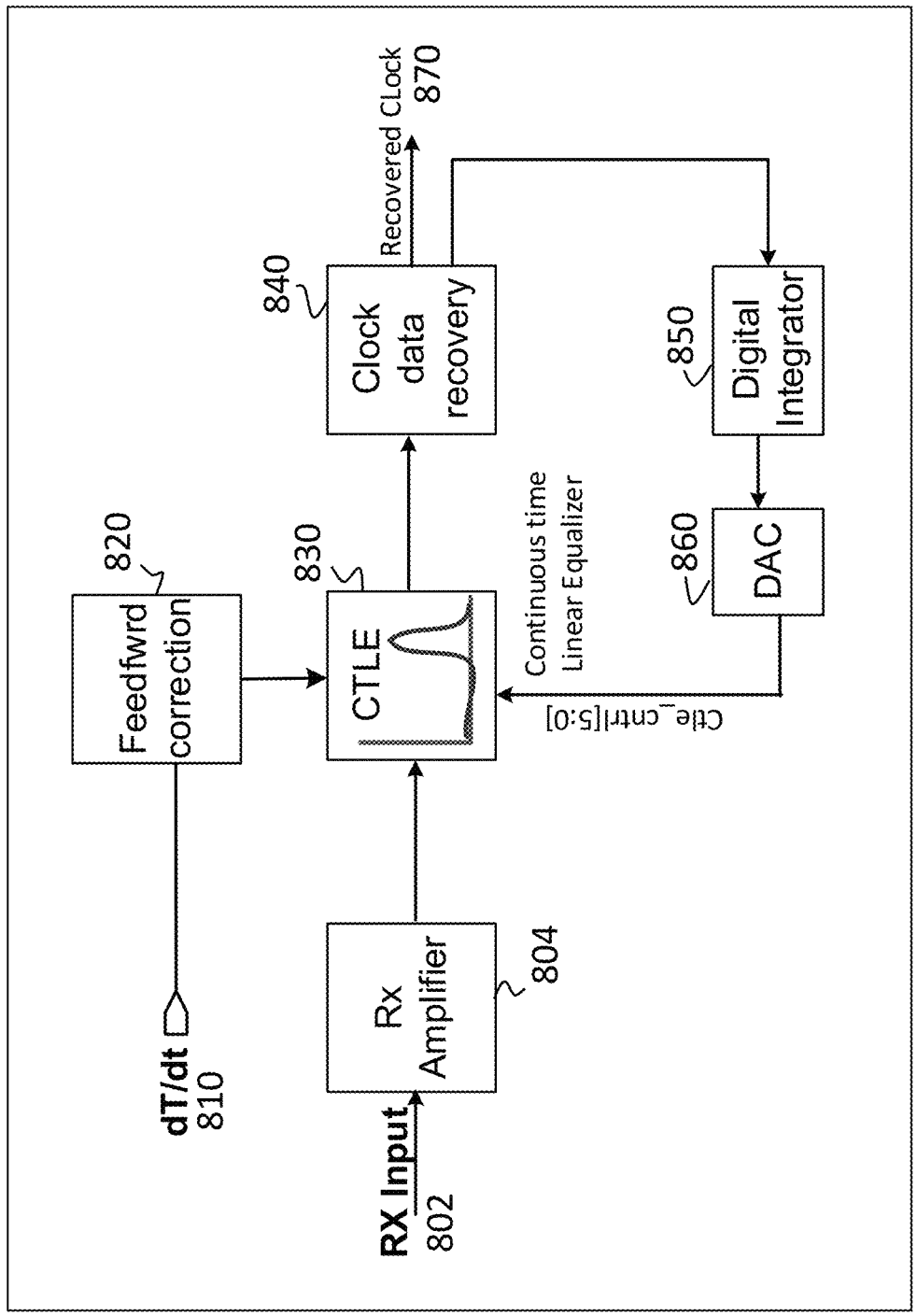
FIG. 8 schematically illustrates an exemplary high speed receiver equalizer tuned with a calibrated ring oscillator according to one embodiment of the disclosure.

FIG. 8 schematically illustrates an exemplary high speed receiver equalizer tuned with a calibrated ring oscillator according to one embodiment of the disclosure. In FIG. 8, a calibrated ring oscillator (not shown) measure the rate of temperature change (dT/dt) and sends a corresponding signal to Feedforward correction logic 820. Feedforward correction logic 820 may be similar to the that of Feedforward correction logic of FIG. 6.

Receiver input signal 802 is directed to receiver amplifier 804, which outputs a signal to the continuous time linear equalizer logic (CTLE) 830. CTLE 830 is a conventional linear filter applied at the received signal to, among functions, attenuate low-frequency signal components and amplify components around the Nyquist frequency. CTLE 830 may comprise hardware, software or a combination of hardware and software. CTLE 830 determines and transmits a clock recovery signal to clock data recovery 840 which in-turn produces recovered clock signal 870. The recovered clock signal 870 is also proceed through digital integrator 850 and Digital-to-Analog convertor (DAC) 860 and fed back to CTLE 830. Thus, Feedforward correction 820 is used to change the zero frequency/pole ratio and equalizer gains.

Figure 9:
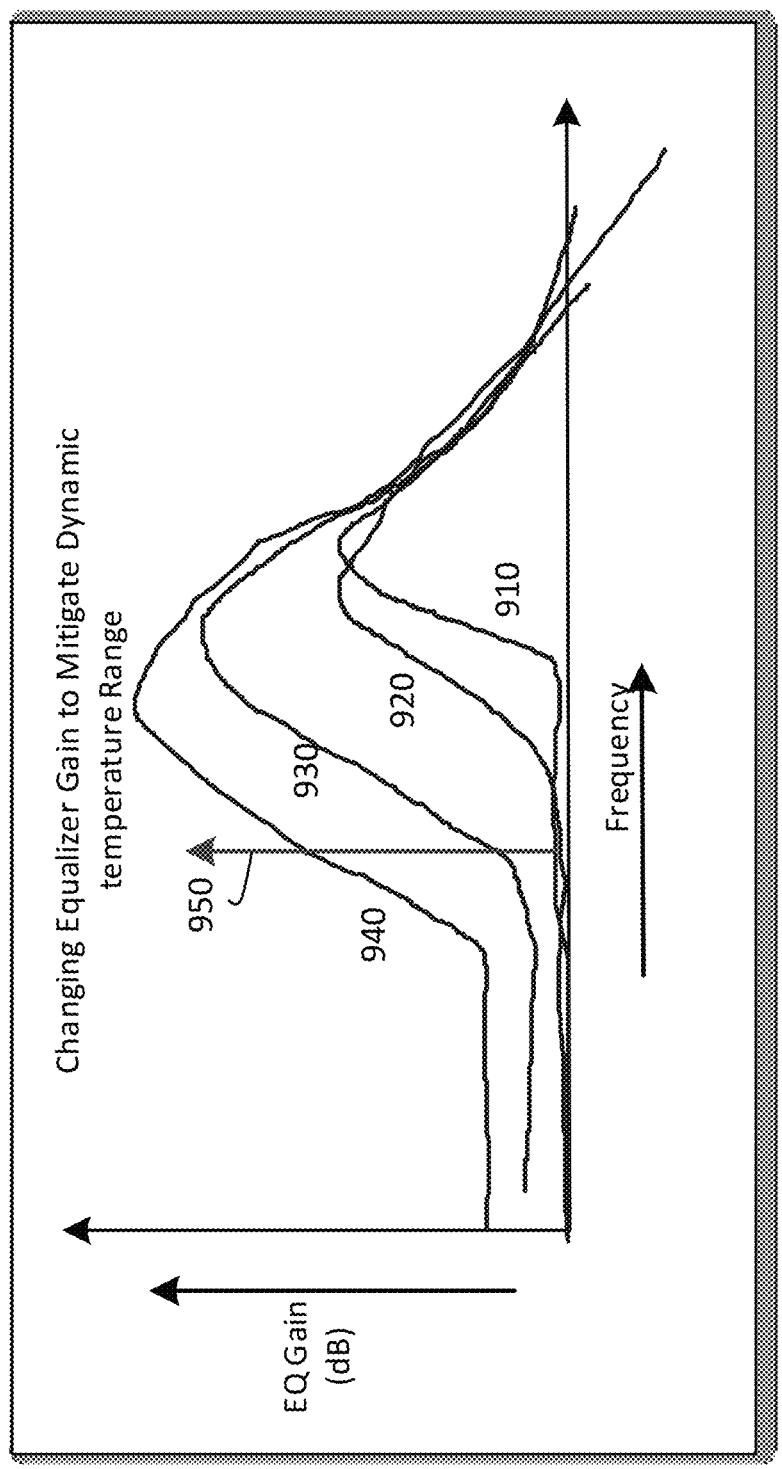
FIG. 9 is a plot of adaptive equalizer gain tuning according to one embodiment of the disclosure.

FIG. 9 shows adaptive equalizer gain tuning according to one embodiment of the disclosure. Specifically, FIG. 9 shows the changing of equalizer gain to mitigate dynamic temperature ranges. In FIG. 9, the X-axis represents frequency and the Y-axis represents Equalizer Gain. Each of bands 910, 920, 930 and 940 represents different operating frequency band of the high speed equalizer. Temperature line 950 also shows the change in temperature. It can be readily seen from the plot of FIG. 9 that frequency can be shifted to accommodate a large temperature range. As shown in FIGS. 8 and 9, the rate of temperature change can be monitored and the equalizer gain may be adjusted accordingly to (as input to Feedforward logic correction loop) to accommodate the temperature change. For discrete time equalizers, a filter-based coefficient adjustment can be used. Equations (3) and (4) are gain equation that govern equalizer gain change based on Temperature.

$$A(T) = A(T-1) - \frac{dT}{dt} * \text{Correction code} \quad (3)$$

$$\frac{Fzero(T)}{FPole(T)} = \frac{Fzero(T-1)}{FPole(T-1)} - \frac{dT}{dt} * \text{Scale code} \quad (4)$$

Figure 10:
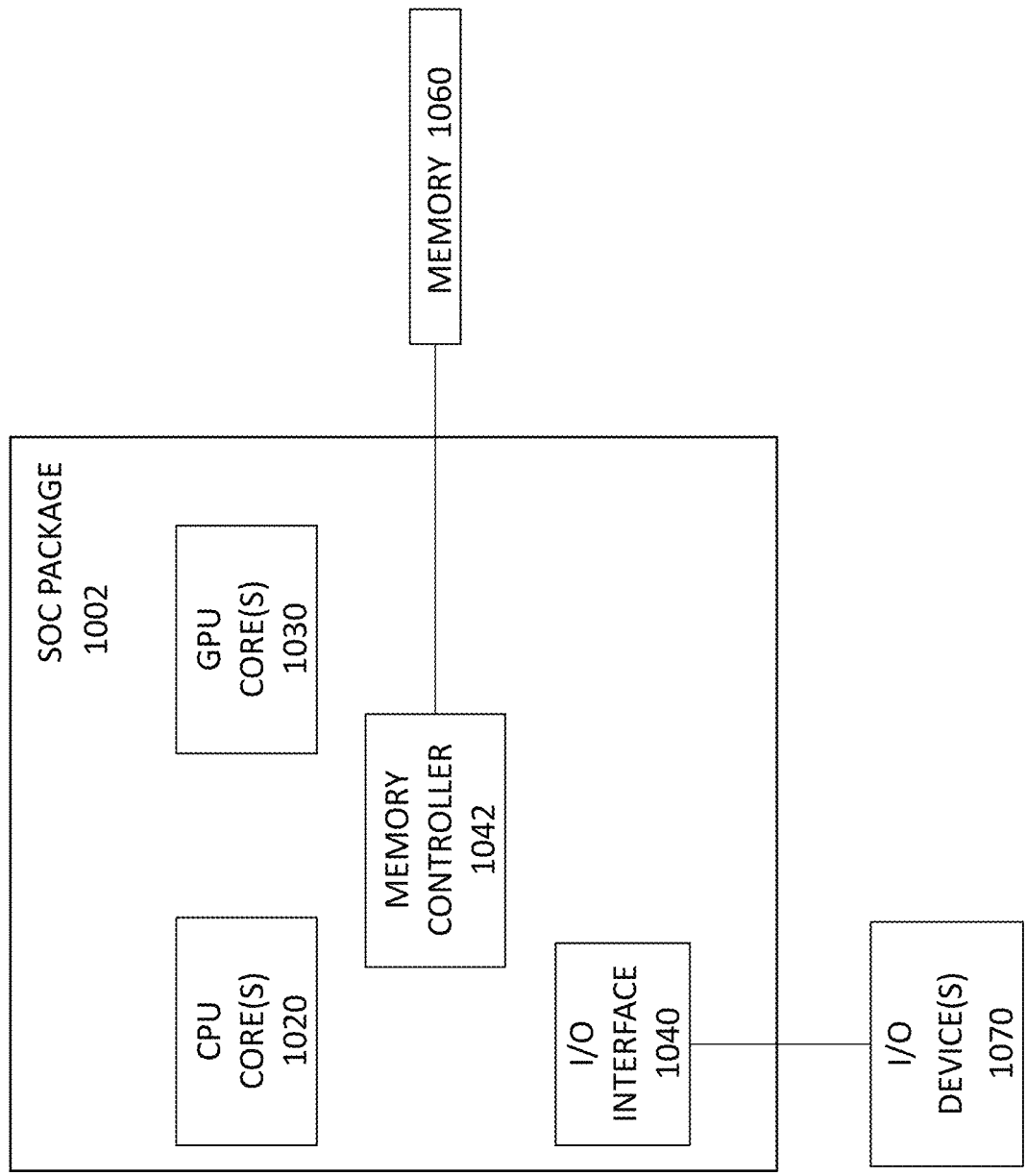
FIG. 10 illustrates a block diagram of an SOC package in accordance with an embodiment.

FIG. 10 illustrates a block diagram of an SOC package in accordance with an embodiment. Specifically, FIG. 10 illustrates a block diagram of an SOC package in accordance with an embodiment. By way of example, the disclosed principles for testing memory and diagnostic components may be implemented at the SOC package of FIG. 10. As illustrated in FIG. 10, SOC 1002 includes one or more Central Processing Unit (CPU) cores 1020, one or more Graphics Processor Unit (GPU) cores 1030, an Input/Output (I/O) interface 1040, and a memory controller 1042. Various components of the SOC package 1002 may be coupled to an interconnect or bus such as discussed herein with reference to the other figures. Also, the SOC package 1002 may include more or less components, such as those discussed herein with reference to the other figures. Further, each component of the SOC package 1020 may include one or more other components, e.g., as discussed with reference to the other figures herein. In one embodiment, SOC package 1002 (and its components) is provided on one or more Integrated Circuit (IC) die which are packaged into a single semiconductor device.

SOC package 1002 is coupled to a memory 1060 via the memory controller 1042. In an embodiment, the memory 1060 (or a portion of it) can be integrated on the SOC package 1002. The I/O interface 1040 may be coupled to one or more I/O devices 1070, e.g., via an interconnect and/or bus such as discussed herein with reference to other figures. I/O device(s) 1070 may include one or more of a keyboard, a mouse, a touchpad, a display, an image/video capture device (such as a camera or camcorder/video recorder), a touch screen, a speaker, or the like.

Figure 11:
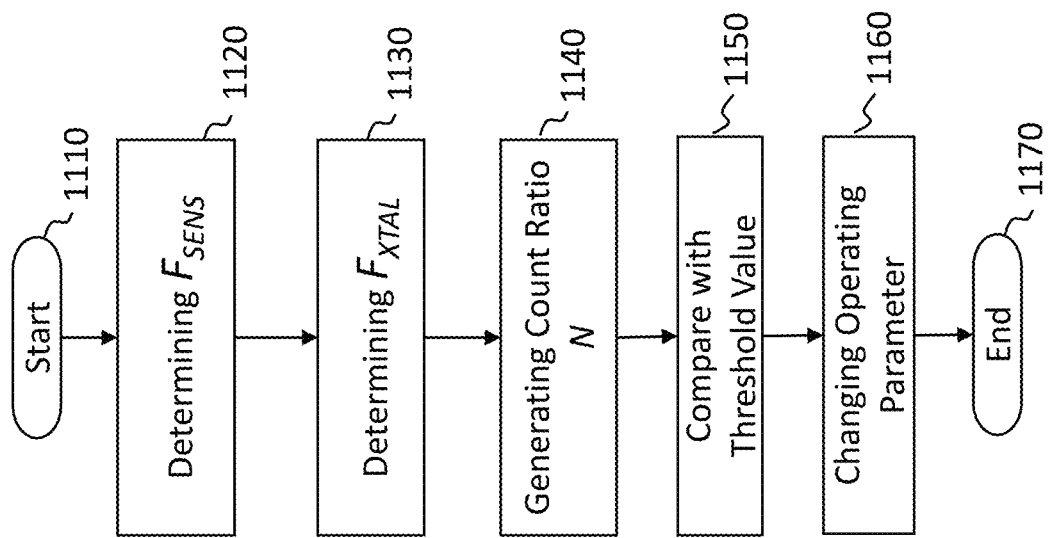
FIG. 11 shows an exemplary flow diagram according to one embodiment of the disclosure.

FIG. 11 shows an exemplary flow diagram according to one embodiment of the disclosure. The flow diagram of FIG. 11 starts at step 1110. The starting step may be triggered by an external event (e.g., a timer) or it may be triggered by a sensed temperature rise or a rise in the SOC's use.

At step 1120, the ring oscillator's frequency value ($F_{SENSE}$) is measured or determined. The measured frequency value may be a first of a series of ring oscillator's measured frequency value. The ring oscillator may be process calibrated according to the disclosed principles.

At step 1130 the clock frequency value ($F_{XTAL}$) for the SOC is measured or determined. In one embodiment, the $F_{XTAL}$ value may represent the main system clock frequency for the SOC. In another embodiment, the $F_{XTAL}$ value may be the clock frequency of a component (e.g., IP) of the SOC.

At step 1140 a count ratio (N) is calculated or generated as a function of $F_{SENSE}$ and $F_{XTAL}$, according to the above-disclosed principles. Step 1130 may also include measuring a plurality of count ratio values (e.g., N and N−1) for different operating frequencies. The temperature rate of change (dT/dt) may be calculated as the difference between two different count ratios (i.e., Count (N)−Count (N−1); where Count (N)=$F_{SENSE}/F_{XTAL}$. It should be noted that the measured or determined values may be targeted to a region of the SOC. That is, several measurements and determinations may be implemented simultaneously or sequentially targeting different regions of the SOC where each region comprises one or more IP functionality or operating component.

At step 1150, the value of Count (N) determined at step 1140 is compared with a threshold value. The threshold value may be stored at a look-up table or other data table stored at the SOC's memory circuitry. The look-up table may be prepared apriori to include operating parameter for a given IP or operating components. Such values may define the operating parameters for the IP component and potentially the corresponding operating temperatures. Once the threshold values are compared with the operating values, a determination can be made as to whether the operating parameters of the component under study needs to change or remain the same.

At step 1160, depending on the outcome of step 1150, the operating parameter for the IP component may be changed to accommodate the temperature change (or rate of temperature change). The accommodation my include, for example, increasing or decreasing operating speed to optimize operation of SOC and prevent potential chip failure. Step 1160 may also include, optionally, reporting the determined information to a source to the SOC. For example, the SOC may send a signal to the larger platform of the rate of temperature rise. This, in turn, may start a process of shutting down the SOC or warning an operator of a potential failure.

The following examples are provided to further illustrates embodiments of the disclosure. The following examples are non-limiting and illustrative in purpose.

Example 1 is directed to a System-On-Chip (SoC) with dynamically temperature detection, comprising: a solid state die having integrated thereon: a first component positioned at a first region of the SoC, the first component configured to perform a first SOC function; a dynamic temperature sensor positioned proximal to the first component, the dynamic temperature sensor configured to oscillate at a first frequency; a controller to communicate with the first integrated component and the dynamic temperature sensor, the controller configured to receive a first frequency signal indicative of a relative temperature at the first region of the SOC, the controller to direct the first component to change an operating parameter of the first function responsive to the first frequency signal.

Example 2 is directed to the SOC of Example 1, wherein the controller is further configured to direct the first component to change the operating parameter responsive to the rate of change of the first frequency signal.

Example 3 is directed to the SOC of Example 1, wherein the controller is further configured to direct the first component to change the operating parameter as a function of a crystal oscillator frequency ($F_{XTAL}$) and sensed frequency ($F_{SENSE}$) of the dynamic temperature sensor.

Example 4 is directed to the SOC of Example 2, wherein the controller is further configured to generate a count (N) as a function of $F_{SENSE}/F_{XTAL}$ and wherein the controller is configured to compare the count (N) with a reference count.

Example 5 is directed to the SOC of Example 3, wherein the controller further comprises a decision logic to render a determination directing the first component to change the operating frequency.

Example 6 is directed to the SOC of Example 1, wherein the dynamic temperature sensor comprises a calibrated ring oscillator.

Example 7 is directed to the SOC of Example 1, wherein the first component is one of a Phase Lock Loop, an analog circuitry, a transceiver and an equalizer.

Example 8 is directed to the SOC of Example 1, further comprising a plurality of dynamic temperature sensors positioned proximal to the first component, wherein each of the plurality of dynamic temperature sensors communicates its respective sensed frequency to the controller.

Example 9 is directed to a method to dynamically control temperature on an integrated System-On-Chip, the method comprising: determining a ring oscillator clock frequency value (FSENS) for associated with a first region of the SOC; determining a clock frequency value for the SoC (FXTAL); generating a count ratio (N) of as a function of FSENS and Fxtal; comparing the count ratio (N) with a reference count value to determine a dynamic temperature range for the first region of the SOC; configuring a first component at the first region of the SOC to operate at a first parameter corresponding to the dynamic temperature range determined at the first region of the SOC.

Example 10 is directed to the method of Example 9, wherein the reference count value is obtained from a look-up table stored at a memory circuitry of the SOC.

Example 11 is directed to the method of Example 10, wherein the reference count value is selected as a function of a calibration logic to indicate the first component's operating limits at a temperature gradient.

Example 12 is directed to the method of Example 9, wherein the ring oscillator is calibrated.

Example 13 is directed to the method of Example 9, wherein configuring the first component to operate at a first parameter further comprises changing the operating parameter responsive to a rate of change of the first frequency value (FSENSE).

Example 14 is directed to the method of Example 9, wherein the count ratio indicates an operating temperature rate of change at the first region of the SOC.

Example 15 is directed to the method of Example 9, wherein the first component is one of a Phase Lock Loop, an analog circuitry, a transceiver and an equalizer.

Example 16 is directed to the method of Example 9, further comprising determining a plurality of ring oscillator frequency values, each ring oscillator frequency value corresponding to a different ring oscillator associated with the first region of the SOC.

Example 17 is directed to a non-transient machine-readable medium comprising instructions that, when executed by computing hardware, including a processor coupled to a memory circuitry and to one or more calibrated ring oscillator, cause the computing hardware to cause a System-on-Chip (SoC) to: determine a ring oscillator clock frequency value (FSENS) for a first of the plurality of calibrated ring oscillator associated with a first region of the SOC; determine a clock frequency value for the SoC (FXTAL); generate a count ratio (N) of as a function of FSENS and Fxtal; compare the count ratio (N) with a reference count value to determine a dynamic temperature range for the first region of the SOC; configure a first component at the first region to operate at a first parameter corresponding to the determined dynamic temperature range at the first region of the SOC.

Example 18 is directed to the machine-readable medium of Example 17, wherein the reference count value is obtained from a lookup table stored at the memory circuitry.

Example 19 is directed to the machine-readable medium of Example 18, wherein the reference count value is selected as a function of a calibration logic to indicate the first component's operating limits at a temperature gradient.

Example 20 is directed to the machine-readable medium of Example 17, wherein the ring oscillator is calibrated.

Example 21 is directed to the machine-readable medium of Example 17, wherein the instructions further cause the computing hardware to operate at a first parameter by changing the operating parameter responsive to a rate of change of the first frequency value (FSENSE).

Example 22 is directed to the machine-readable medium of Example 17, wherein the count ratio indicates an operating temperature rate of change at the first region of the SOC.

Example 23 is directed to the machine-readable medium of Example 17, wherein the first component is one of a Phase Lock Loop, an analog circuitry, a transceiver and an equalizer.

Example 24 is directed to the machine-readable medium of Example 17, wherein the instructions further cause the computing hardware to determine a plurality of ring oscillator frequency values, each ring oscillator frequency value corresponding to a different ring oscillator associated with the first region of the SOC.

Embodiments described above illustrate but do not limit this application. While a number of exemplary aspects and embodiments have been discussed above, those of skill in the art will recognize certain modifications, permutations, additions and sub-combinations thereof. Accordingly, the scope of this disclosure is defined only by the following claims.

What is claimed is:

1. A processing device comprising:
   a die having integrated thereon:
      a plurality of ring oscillators configured to have a temperature-varying frequency at an output; and
      a storage device configured to store data indicating a relationship between temperature and an output frequency of each of the plurality of ring oscillators; and
   circuitry configured to:
      determine a temperature of a first region corresponding to a current output frequency of a first ring oscillator of the plurality of ring oscillators, the first region comprising a Central Processing Unit (CPU), and the temperature of the first region being determined using the stored data indicating the relationship between temperature and output frequency for the first ring oscillator;
      determine a temperature of a second region corresponding to a current output frequency of a second ring oscillator of the plurality of ring oscillators, the second region comprising a graphics processing unit (GPU), and the temperature of the second region being determined using the stored data indicating the relationship between temperature and output frequency for the second ring oscillator; and
      provide a temperature measurement indicative of the temperature of the first region and the temperature of the second region.

2. The processing device of claim 1, further comprising:
   a controller configured to trigger a temperature reduction action based on the temperature measurement.

3. The processing device of claim 2, wherein the temperature reduction action includes hardware throttling.

4. The processing device of claim 2, wherein the temperature reduction action includes triggering a hardware thermal shutdown.

5. The processing device of claim 1, wherein the processing device is included in a System-on-Chip (SoC).

6. The processing device of claim 1, wherein each of the plurality of ring oscillators is calibrated before use.

7. A system-on-a-chip (SoC) comprising:
   a die having integrated thereon:
      a Central Processing Unit (CPU) at a first region of the SoC;
      a first ring oscillator configured to have a temperature-varying frequency at an output, the first ring oscillator positioned at the first region of the SoC;
      a storage device configured to store data indicating a relationship between temperature and an output frequency of the first ring oscillator; and
      a temperature sensor configured to:
         determine a temperature of the first region corresponding to a current output frequency of the first ring oscillator, the temperature of the first region being determined using the stored data indicating the relationship between temperature and output frequency for the first ring oscillator; and
         provide a first temperature measurement indicative of the temperature of the first region.

8. The SoC of claim 7, further comprising:
   a graphics processing unit (GPU) at a second region of the SoC; and
   a second ring oscillator configured to have a temperature-varying frequency at an output, the second ring oscillator positioned at the second region of the SoC;
   wherein the storage device is configured to store data indicating a relationship between temperature and an output frequency of the second ring oscillator; and
   wherein the temperature sensor is configured to determine a temperature of the second region corresponding to a current output frequency of the second ring oscillator, and provide second temperature measurement indicative of the temperature of the second region, the temperature of the second region being determined using the stored data indicating the relationship between temperature and output frequency for the second ring oscillator.

9. The SoC of claim 8, further comprising a controller configured to trigger a temperature reduction action based on at least one of the first temperature measurement and the second temperature measurement.

10. The SoC of claim 9, wherein the temperature reduction action includes hardware throttling.

11. The SoC of claim 9, wherein the temperature reduction action includes triggering a hardware thermal shutdown.

12. The SoC of claim 7, further comprising a high-speed input/output (I/O) interface.

13. The SoC of claim 7, further comprising a camera interface.

14. At least one non-transitory machine-readable medium comprising instructions that, when executed by computing hardware, including a processor coupled to a memory circuitry and to a plurality of ring oscillators, cause the computing hardware to cause a System-on-Chip (SoC) to:
   obtain stored data, from a storage device of the SoC, the stored data indicating a relationship between temperature and an output frequency of each of the plurality of ring oscillators;
   determine a temperature of a first region corresponding to a current output frequency of a first ring oscillator of the plurality of ring oscillators, the first region comprising a Central Processing Unit (CPU), and the temperature of the first region being determined using the stored data indicating the relationship between temperature and output frequency for the first ring oscillator;
   determine a temperature of a second region corresponding to a current output frequency of a second ring oscillator of the plurality of ring oscillators, the second region comprising a graphics processing unit (GPU), and the temperature of the second region being determined using the stored data indicating the relationship between temperature and output frequency for the second ring oscillator; and provide a temperature measurement indicative of the temperature of the first region and the temperature of the second region.

15. The non-transitory machine-readable medium of claim 14, wherein the instructions further cause the SoC to:
trigger a temperature reduction action based on the temperature measurement.

16. The non-transitory machine-readable medium of claim 15, wherein the temperature reduction action includes hardware throttling.

17. The non-transitory machine-readable medium of claim 15, wherein the temperature reduction action includes triggering a hardware thermal shutdown.

18. The processing device of claim 2, wherein the temperature reduction action includes hardware throttling followed by a hardware thermal shutdown.

19. The SoC of claim 9, wherein the temperature reduction action includes hardware throttling followed by a hardware thermal shutdown.

20. The SoC of claim 19, further comprising:
a high-speed input/output (I/O) interface; and
a camera interface;
wherein the first ring oscillator and the second ring oscillator are calibrated before use.

21. The non-transitory machine-readable medium of claim 15, wherein the temperature reduction action includes hardware throttling followed by a hardware thermal shutdown.

22. A system-on-a-chip (SoC) comprising:
a die having integrated thereon:
at least one of a high-speed input/output (I/O) interface or a camera interface;
a Central Processing Unit (CPU) at a first region of the SoC;
a first ring oscillator configured to have a temperature-varying frequency at an output, the first ring oscillator positioned at the first region of the SoC;
a Graphics Processing Unit (GPU) at a second region of the die;
a second ring oscillator configured to have a temperature-varying frequency at an output, the second ring oscillator positioned at the second region of the SoC;
a storage device configured to store data indicating a relationship between temperature and an output frequency of the first ring oscillator and the second ring oscillator;
a temperature sensor configured to:
determine a temperature of the first region corresponding to a current output frequency of the first ring oscillator, the first region comprising a Central Processing Unit (CPU), and the temperature of the first region being determined using the stored data indicating the relationship between temperature and output frequency for the first ring oscillator;
provide a first temperature measurement indicative of the temperature of the first region;
determine a temperature of the second region corresponding to a current output frequency of the second ring oscillator, the temperature of the second region being determined using the stored data indicating the relationship between temperature and output frequency for the second ring oscillator; and
provide a second temperature measurement indicative of the temperature of the second region; and
a controller configured to trigger a temperature reduction action based on at least one of the first temperature measurement and the second temperature measurement, wherein the temperature reduction action includes at least one of hardware throttling or a hardware thermal shutdown;
wherein the first ring oscillator and the second ring oscillator are calibrated before use.

* * * * *